United States Patent
Zuber (10) Patent No.: US 10,890,476 B1
(45) Date of Patent: Jan. 12, 2021

(54) STORAGE CONTAINER WITH MEASURING SPOUT

(71) Applicant: Adam A. Zuber, Fort Myers, FL (US)

(72) Inventor: Adam A. Zuber, Fort Myers, FL (US)

( * ) Notice: Subject to any disclaimer, the term of this patent is extended or adjusted under 35 U.S.C. 154(b) by 0 days.

(21) Appl. No.: 16/135,928

(22) Filed: Sep. 19, 2018

(51) Int. Cl.
- *G01F 11/26* (2006.01)
- *B65D 5/76* (2006.01)
- *A47G 19/32* (2006.01)
- *B65D 25/52* (2006.01)

(52) U.S. Cl.
CPC ............ *G01F 11/261* (2013.01); *A47G 19/32* (2013.01); *B65D 5/76* (2013.01); *B65D 25/525* (2013.01); *G01F 11/268* (2013.01)

(58) Field of Classification Search
CPC .......... B65D 5/744; B65D 5/76; B65D 35/22; B65D 77/065–068; B65D 81/3244; B65D 81/325; B65D 81/3227; G01F 19/00; G01F 19/02; G01F 11/261–262; G01F 11/268

See application file for complete search history.

(56) References Cited

U.S. PATENT DOCUMENTS

| | | | |
|---|---|---|---|
| 1,155,323 A | 9/1915 | McBroom | |
| 1,965,233 A * | 7/1934 | Guyer | B65D 5/744 222/183 |
| 2,069,281 A * | 2/1937 | Sebreny | B65D 5/742 229/219 |
| 2,311,255 A * | 2/1943 | Read | B65D 5/746 222/90 |
| 2,352,587 A * | 6/1944 | Muller | B65D 47/046 222/531 |
| 2,613,856 A * | 10/1952 | Ely | B65D 5/76 222/364 |
| 2,676,734 A | 4/1954 | Mertens | |
| 2,768,772 A * | 10/1956 | Franseen | G01F 11/261 222/455 |
| 2,898,004 A * | 8/1959 | Klausmann | B65D 5/744 222/129 |
| 2,943,769 A * | 7/1960 | Klausmann | B65D 5/76 222/364 |
| 3,057,524 A * | 10/1962 | Shanks | G01F 11/40 222/430 |
| 3,057,525 A * | 10/1962 | Malachick | B65D 25/525 222/482 |
| 3,250,436 A * | 5/1966 | Kurtz | B65D 5/744 222/153.07 |
| 3,456,852 A * | 7/1969 | Linn | G01F 11/261 222/284 |
| 3,484,025 A | 12/1969 | Capalia | |
| 3,511,416 A * | 5/1970 | Michie | G01F 11/261 222/305 |
| 3,831,833 A * | 8/1974 | Dressler | B65D 5/76 229/125.42 |

(Continued)

*Primary Examiner* — Paul R Durand
*Assistant Examiner* — Randall A Gruby
(74) *Attorney, Agent, or Firm* — Bryan L. Loeffler, Esq.; Loeffler IP Group, PA (57) ABSTRACT

A storage container (1) having a pour spout (7) that doubles as a measuring cup for dispensing a set amount of contents from the storage container. A user may manipulate the storage container to force the contents into the spout. The contents are prevented from falling or spilling out of the spout while the storage container is in an upright position.

11 Claims, 5 Drawing Sheets

(56) References Cited

U.S. PATENT DOCUMENTS

| | | | |
|---|---|---|---|
| 3,921,862 A * | 11/1975 | Holmstrom | B65D 5/76 222/305 |
| 4,111,351 A * | 9/1978 | Mackiernan | B65D 5/744 222/364 |
| 4,667,857 A | 5/1987 | Song | |
| 4,782,984 A | 11/1988 | Su | |
| 4,938,394 A | 7/1990 | Biacchi | |
| 4,951,850 A * | 8/1990 | Clayton | B65D 5/746 222/535 |
| 5,012,959 A * | 5/1991 | Gordon | B65D 5/746 220/269 |
| 5,135,138 A | 8/1992 | Call | |
| D371,297 S * | 7/1996 | Robbins, III | D9/436 |
| 5,531,376 A * | 7/1996 | Brink | B65D 5/744 229/207 |
| 5,791,528 A * | 8/1998 | Robbins, III | B65D 5/744 222/364 |
| 5,988,447 A * | 11/1999 | Yaski | B65D 5/744 222/158 |
| 6,062,467 A * | 5/2000 | Ours | B65D 5/744 229/117.3 |
| 6,145,736 A * | 11/2000 | Ours | B65D 5/744 229/117.3 |
| 8,794,503 B2 * | 8/2014 | Burgos Agudo | B65D 5/721 229/125.04 |
| 10,392,154 B2 * | 8/2019 | Burgos Agudo | B65B 31/00 |
| 2006/0000880 A1 * | 1/2006 | Wein | B65D 5/744 229/215 |
| 2008/0257917 A1 | 10/2008 | Lee | |
| 2008/0283557 A1 * | 11/2008 | Desautels | B65D 5/721 222/535 |
| 2011/0266311 A1 | 11/2011 | Nielsen | |
| 2014/0033658 A1 | 2/2014 | Habraken et al. | |

* cited by examiner

STORAGE CONTAINER WITH MEASURING SPOUT

FIELD OF THE INVENTION

The present invention relates generally to storage containers and more particularly to a storage container having a pour spout that doubles as a measuring cup for dispensing a set amount of contents, whether such be dry food or liquid from the storage container.

BACKGROUND OF THE INVENTION

Dry foods, such as cereal, oats, pasta, pet food and so forth, are commonly stored in sealable storage containers to maintain freshness and prolong shelf life. These conventional storage containers have two methods of dispensing food.

A first method is removing a lid from the container and using a scoop to transfer food from the container into a bowl or other serving dish. This can be unsanitary as the scoop is normally stored inside the container in the dry food. This can also be inconvenient as the scoop can be lost if stored outside the container. Alternatively, the scoop can become buried under the dry food when stored inside the container.

A second method is using a spout integrated into the container that allows the user to freely pour the dry food out of the container. Of course, this often results in the user dispensing an amount that is larger than the suggested or desired serving size. This creates a problem as many individuals are concerned with measuring serving sizes in an effort to diet and/or maintain health.

Similar problems exist with pouring liquids from containers.

Therefore, a need exists for a storage container having a pour spout that doubles as a measuring cup for dispensing a set amount of contents from the storage container, whether such be dry food or liquid from the storage container.

SUMMARY OF THE INVENTION

The primary object of the present invention is to provide a storage container having a pour spout that doubles as a measuring cup for dispensing a set amount of contents from the storage container, whether such be dry food or liquid from the storage container.

The present invention fulfills the above and other objects by providing storage container for storing dry foods, such as cereal, oats, pasta, pet food and so forth, or liquids wherein the storage container provides a spout that doubles as a measuring cup. The spout preferably has a front panel, two side panels and a rear panel. The spout is pivotally mounted within a rectangular-shaped opening in a perimeter side wall of the container. When the spout is in a closed position, the front panel is flush with the perimeter side wall, thereby sealing the storage container while the side panels and rear panel are recessed inside the storage container. A user may manipulate the storage container to force dry or liquid contents into the spout. The rear panel and side panels prevent the contents from falling out of the spout while the storage container is in an upright position. The spout is preferably sized to hold a predetermined measurement unit of volume of dry food or liquid, such as a cup, a half of a cup, a third of a cup, a quarter of a cup and so forth. The spout may be placed in an open position by pulling the front panel forward away from the perimeter side wall of the storage container until the rear panel is parallel with the perimeter side wall. The contents of the spout may then be poured into a serving dish while the rear panel prevents any remaining contents in the storage container from spilling out of the container.

The spout may have a fixed size equivalent to a standard serving size or measurement unit of volume. Alternatively, the size of the spout may be adjustable to allow the user to select an amount that is held in the spout and hence dispensed via the spout, such as one cup, a half of a cup, a third of a cup, a quarter of a cup and so forth. This may be accomplished by increasing or decreasing the size of the spout, by the use of partitions, through the use of nested spouts and so forth.

The spout may be a pivoting spout that is filled and then pivoted out of the storage container to allow the contents thereof to be dispensed. The spout may also be fixed in the lid or side wall and have a snap lid that allows a user to dispense the contents thereof.

The spout may be located on a side wall of the storage container or on the lid the storage container. The storage container and/or spout may be constructed out of any material, such as plastic, cardboard, paper, metal, wood and so forth.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
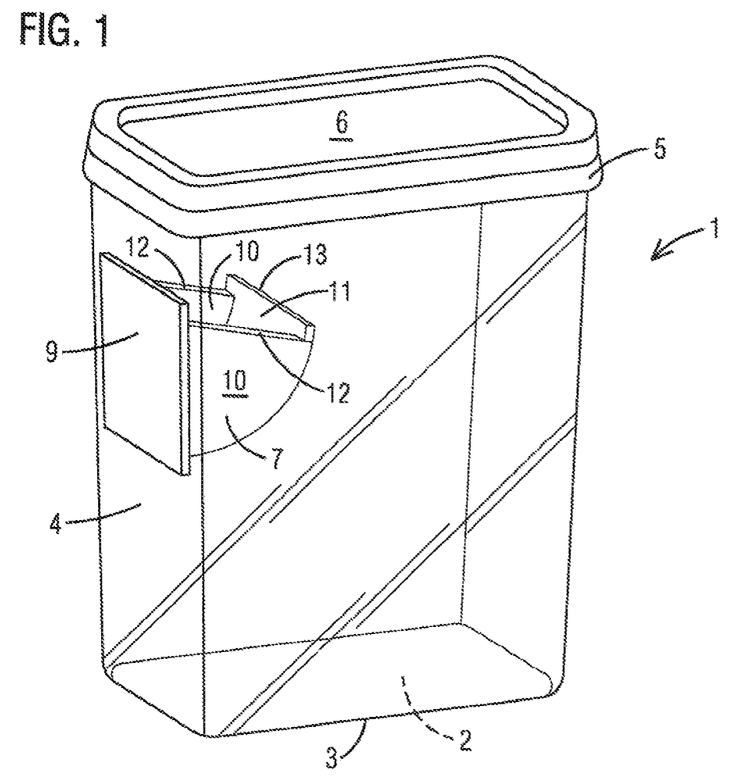
FIG. 1 is a perspective side view of a storage container of the present invention.

For purposes of describing the preferred embodiment, the terminology used in reference to the numbered accessories in the drawings is as follows:

1. storage container, generally
2. bottom panel of storage container
3. perimeter edge of bottom panel
4. perimeter side wall
5. upper edge of perimeter wall
6. lid
7. spout
8. opening
9. front panel of spout
10. side panel of spout
11. rear panel of spout
12. upper edge of side panel
13. stop
14. partition
15. size reducing means
16. first spout
17. second spout
18. third spout
19. fourth spout
20. spacer
21. pull tab
22. first pull tab
23. second pull tab
24. third pull tab
25. fourth pull tab
26. sliding tab
27. hinged panel With reference to FIG. 1, a perspective side view of a storage container 1 of the present invention is illustrated. The storage container 1 of the present invention comprises a bottom panel 2 having a perimeter edge 3 and a perimeter side wall 4 extending upward a predetermined distance from the perimeter edge 3 and terminating at an upper edge 5. A lid 6 attaches to the upper edge 5 of the perimeter side wall to seal the storage container 1 shut. As illustrated herein, the storage container 1 is constructed out of transparent material that allows a user to see the contents thereof. However, the storage container 1 may be constructed out of any material, such as plastic, cardboard, paper, metal, wood and so forth.

A spout 7 is pivotally mounted within a substantially rectangular-shaped opening 8 in the perimeter side wall 4 of the storage container 1. The spout 7 preferably comprises a front panel 9, two side panels 10 and a rear panel 11.

When the spout 7 is in a closed position, the front panel 9 is flush or parallel with the perimeter side wall 4, thereby sealing the storage container 1 while the side panels 10 and the rear panel 11 of the spout 7 are located inside the storage container 1. A user may manipulate the storage container 1 to force dry food or liquid into the spout 7. The rear panel 11 and side panels 10 prevent dry food or liquid captured in the spout 7 from falling out of the spout 7 while the storage container 1 is in an upright position. The spout 7 is preferably sized to hold a predetermined volume unit measurement of dry food or liquid, such as one or more cups, a half of a cup, a third of a cup, a quarter of a cup and so forth.

Figure 2:
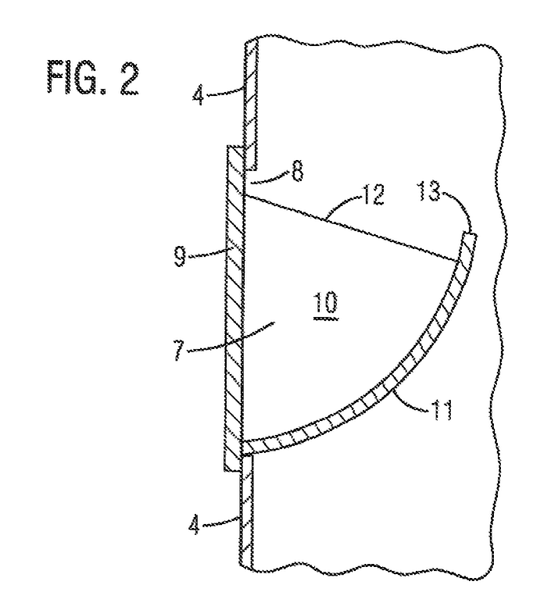
FIG. 2 is a partial cutaway side view of the spout in a closed position on the storage container of the present invention.

With reference to FIG. 2, a partial cutaway side view of the spout 7 in a closed position on the storage container 1 of the present invention is illustrated. The spout 7 is pivotally mounted within the substantially rectangular-shaped opening 8 in the perimeter side wall 4 of the storage container 1. The spout 7 preferably comprises a front panel 9, two side panels 10 and a rear panel 11. The side panels 10 further comprise upper edges 12 that may be angled downward away from the front panel 9 when the spout 7 is in a closed position to allow for clearance when opening the spout 7. At least one stop 13 may be located on or near the rear panel 11 to prevent the spout 7 from extending out of the perimeter side wall 4 when the spout 7 is placed into an open position, as illustrated in FIG. 3.

Figure 3:
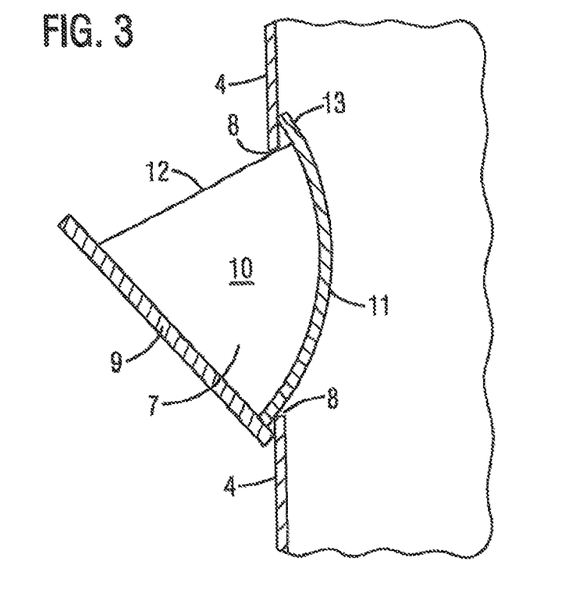
FIG. 3 is a partial cutaway side view of the spout in an open position on the storage container of the present invention.

With reference to FIG. 3, a partial cutaway side view of the spout 7 in an open position on the storage container 1 of the present invention is illustrated. The spout 7 is pivotally mounted within the substantially rectangular-shaped opening 8 in the perimeter side wall 4 of the storage container 1. The spout 7 preferably comprises a front panel 9, two side panels 10 and a rear panel 11. The spout 7 may be placed into an open position by pulling the front panel 9 forward away from the perimeter side wall 4 of the storage container 1 until the rear panel 11 is flush or parallel with the perimeter side wall 4. At least one stop 13 may be located on or near the rear panel 11 to prevent the spout 7 from extending out of the perimeter side wall 4 when the spout 7 is placed into an open position. The contents of the spout 7 may then be poured into a serving dish while the rear panel 11 blocks any remaining contents in the storage container 1 from spilling out of the storage container 1 through the open spout 7.

Figure 4:
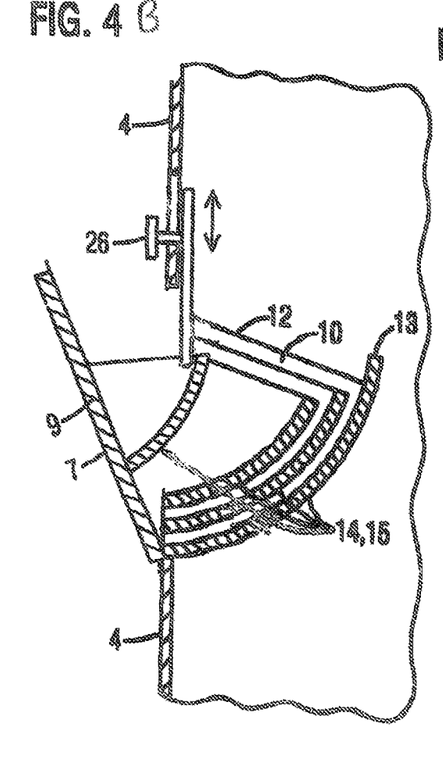
FIG. 4A is a partial cutaway side view of a spout of the present invention in a closed position and having nested partitions.
FIG. 4B is a partial cutaway side view of the spout of the present invention illustrated in FIG. 4 in a partially open position.
Figure 4A:
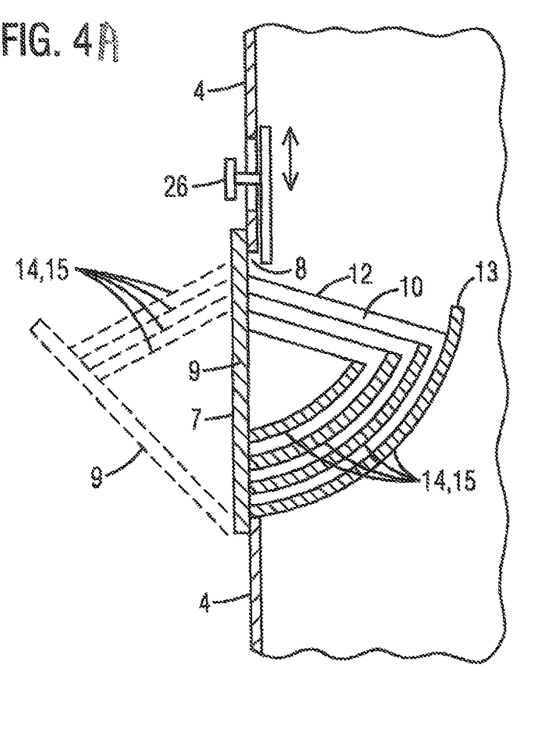

With reference to FIGS. 4A and 4B, partial cutaway side views of a spout 7 of the present invention having nested partitions 14 in a closed position a partially open position, respectively, are illustrated. The size of the spout 7 may be adjustable to allow the user to select an amount of dry food or liquid that is being dispensed via the spout 7, such as one cup, a half of a cup, a third of a cup, a quarter of a cup and so forth. This may be accomplished by increasing or decreasing the size of the spout 7 by having at least one size reducing means 15, such as at least one partition 14, located within the spout 7. The partitions may be manually inserted into the spout 7. Alternatively, the partitions 14 may be selected for use or locked in place using at least one sliding tab 26 that prevents the spout 7 and/or partitions 14 from extending out of the perimeter side 4 wall of the storage container 1. The at least one sliding tab 26 may be manually controlled or controlled via an electronic means.

Figure 5A:
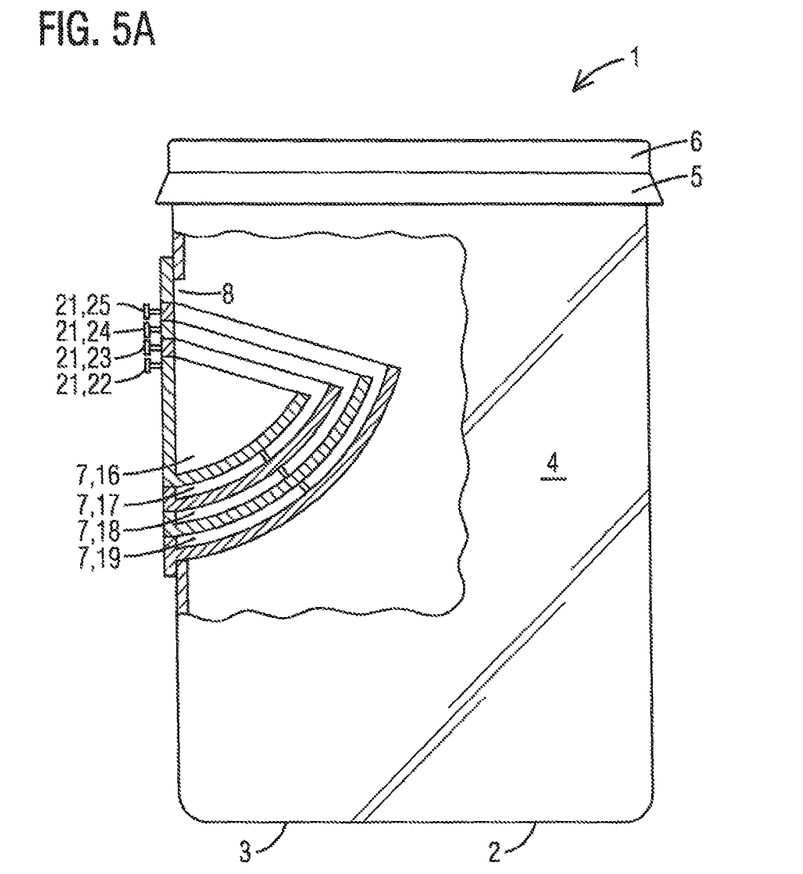
FIG. 5A is a side view of a storage container of the present invention having a plurality of nested spouts having sequential sizes located on a perimeter side wall.
Figure 5B:
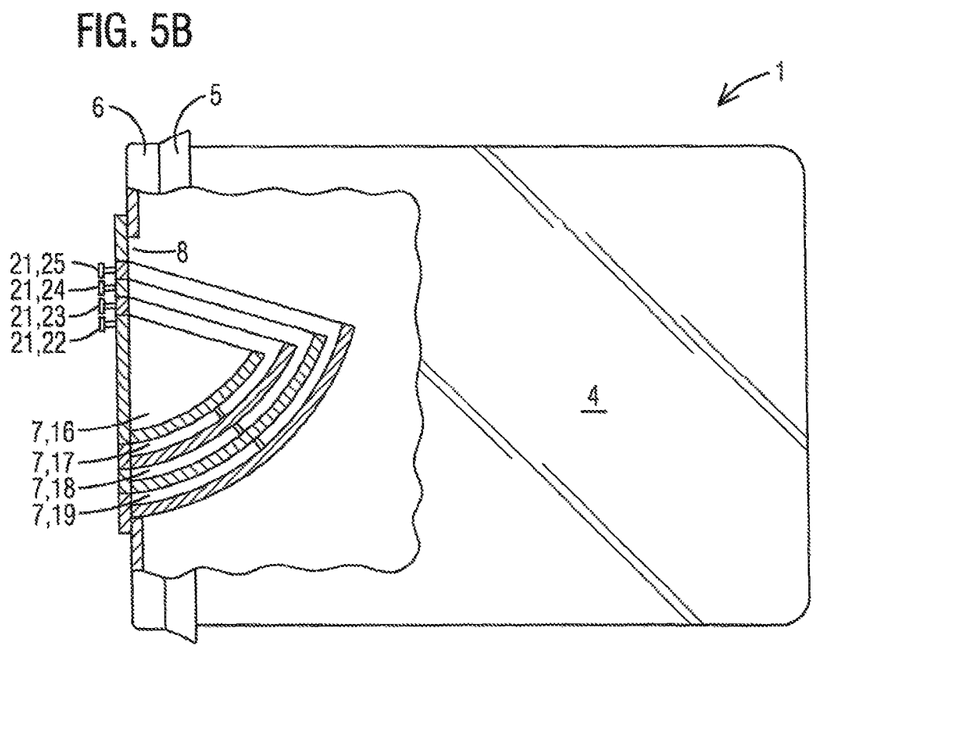
FIG. 5B is a side view of a storage container of the present invention having a plurality of nested spouts having sequential sizes located on a lid.

With reference to FIGS. 5A & 5B, side views of a storage container 1 of the present invention having a plurality of nested spouts 7 having sequential sizes located on a perimeter side wall 4 and on a lid 6, respectively, are illustrated. The storage container 1 of the present invention comprises a bottom panel 2 having a perimeter edge 3 and a perimeter side wall 4 extending upward a predetermined distance from the perimeter edge 3 and terminating at an upper edge 5. A lid 6 attaches to the upper edge 5 of the perimeter side wall to seal the storage container 1 shut. As illustrated herein, the storage container 1 is constructed out of transparent material that allows a user to see the contents thereof. However, the storage container 1 may be constructed out of any material, such as plastic, cardboard, paper, metal, wood and so forth.

A plurality of spouts 7 are pivotally mounted within a substantially rectangular-shaped opening 8 in the perimeter side wall 4 of the storage container 1. The spouts 7 each preferably comprise a front panel 9, two side panels 10 and a rear panel 11, as illustrated in FIG. 1. A first spout 16 is sized to hold a predetermined measurement unit of volume of the contents of the storage container 1, such as a quarter of a cup. Then each subsequent spout 7 is sized to hold a predetermined measurement unit of volume in combination with each spout 7 nested therein. As illustrated herein, a second spout 17 is sized to hold a sequentially larger predetermined measurement unit of volume of the contents of the storage container 1 in combination with the first spout 16, such as a half of a cup. A third spout 18 is sized to hold a sequentially larger predetermined measurement unit of volume of the contents of the storage container 1 in combination with the first spout 16 and the second spout 17, such as a third of a cup. A fourth spout 19 is sized to hold a sequentially larger predetermined measurement unit of volume of the contents of the storage container 1 in combination with the first spout 16, the second spout 17 and the third spout 18, such as a whole cup.

The spouts 7 may be located on the perimeter side wall 4 or on the lid 6 and nested within each other. The spouts 7 may be separated by spacers 20 and may be opened using pull tabs 21 attached to each individual spout 7.

Figure 6:
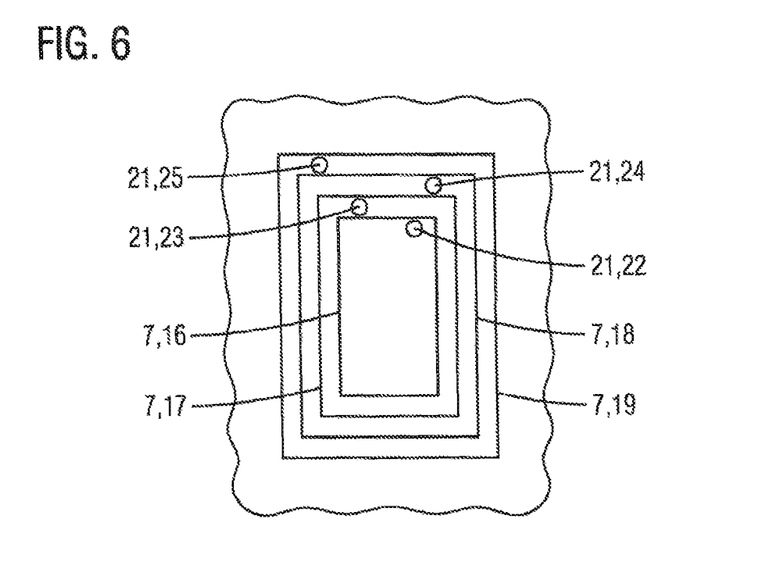
FIG. 6 is a front view of a plurality of nested spouts having a sequential sizes and alternating pull tabs.

With reference to FIG. 6, a front view of a plurality of nested spouts 7 having a sequential sizes and alternating pull tabs 21 is illustrated. For example, to dispense a quarter cup, a user pulls a first pull tab 22 that is attached to the first spout 16. To dispense a half of a cup, the user pulls a second pull tab 23 attached to the second spout 17, thereby pivoting and/or removing the first spout 16 and the second spout 17 and the combined contents thereof out of the storage container 1 to be dispensed. To dispense a third of a cup, the user pulls a third pull tab 24 attached to the third spout 18, thereby pivoting and/or removing the first spout 16, the second spout 17 and the third spout 18 and the combined contents thereof out of the storage container 1 to be dispensed. To dispense a whole cup, the user pulls a forth pull tab 25 attached to the fourth spout 19, thereby pivoting and/or removing the first spout 16, the second spout 17, the third spout 18 and the fourth spout 19 and the combined contents thereof out of the storage container 1 to be dispensed. The spouts 7 may be located on the perimeter side wall 4 or on the lid 6.

Figure 7:
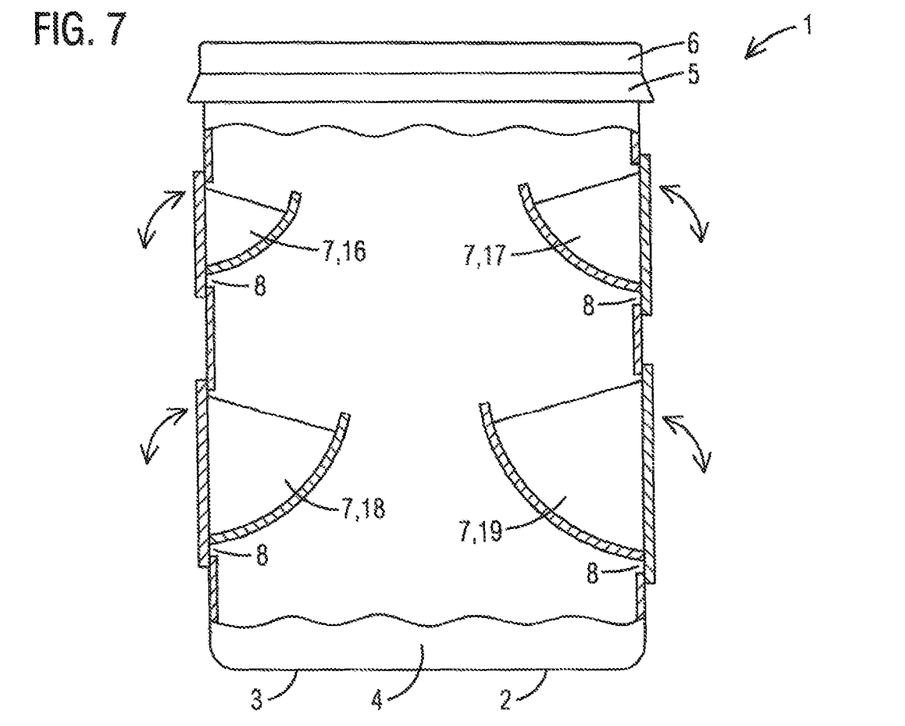
FIG. 7 is a side view of a storage container of the present invention having a plurality of separate spouts having sequential sizes.

With reference to FIG. 7, a side view of a storage container 1 of the present invention having a plurality of separate spouts 7 having sequential sizes is illustrated. The storage container 1 of the present invention comprises a bottom panel 2 having a perimeter edge 3 and a perimeter side wall 4 extending upward a predetermined distance from the perimeter edge 3 and terminating at an upper edge 5. A lid 6 attaches to the upper edge 5 of the perimeter side wall to seal the storage container 1 shut. As illustrated herein, the storage container 1 is constructed out of transparent material that allows a user to see the contents thereof. However, the storage container 1 may be constructed out of any material, such as plastic, cardboard, paper, metal, wood and so forth.

A plurality of spouts 7 are pivotally mounted within a substantially rectangular-shaped opening 8 in the perimeter side wall 4 of the storage container 1. The spouts 7 each preferably comprise a front panel 9, two side panels 10 and a rear panel 11, as illustrated in FIG. 1. A first spout 16 is sized to hold a predetermined measurement unit of volume of the contents of the container, such as a quarter of a cup. Then each subsequent spout 7 is sized to hold a predetermined measurement unit of volume that is greater than the first spout 16. As illustrated herein, a second spout 17 is sized to hold a sequentially larger predetermined measurement unit of volume of the contents of the container than that of the first spout 16, such as a half of a cup. A third spout 18 is sized to hold a sequentially larger predetermined measurement unit of volume of the contents of the container than that of the first spout 16 and the second spout 17, such as a third of a cup. A fourth spout 19 is sized to hold a sequentially larger predetermined measurement unit of volume of the contents of the container than that of the first spout 16, the second spout 17 and the third spout 18, such as a whole cup. The spouts 7 may be located on the perimeter side wall 4 or on the lid 6.

Figure 8:
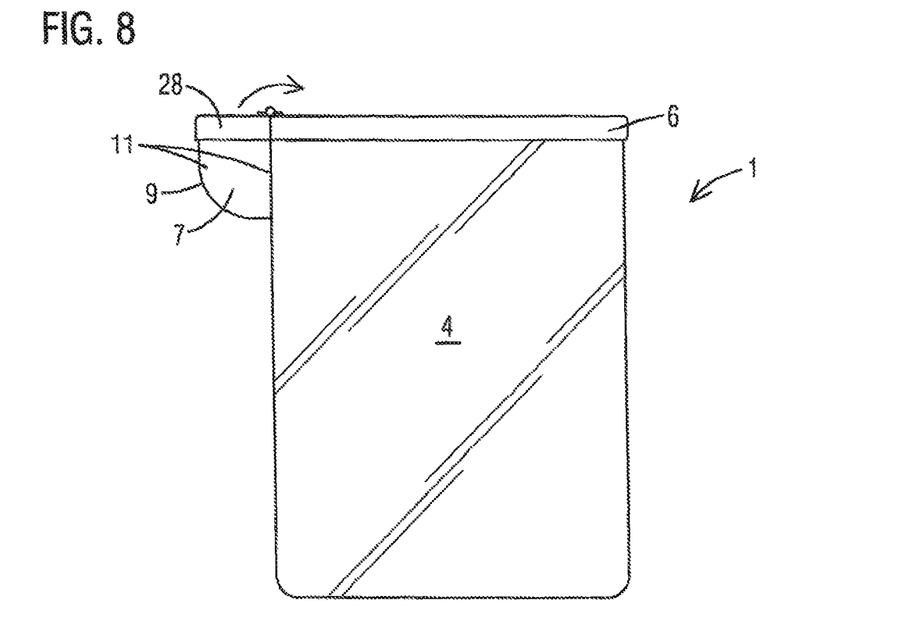
FIG. 8 is a side view of a storage container of the present invention having a spout located on an external surface of the storage container.

With reference to FIG. 8, a side view of a storage container 1 of the present invention having a spout located on an external surface of the storage container 1 is illustrated. The storage container 1 of the present invention comprises a bottom panel 2 having a perimeter edge 3 and a perimeter side wall 4 extending upward a predetermined distance from the perimeter edge 3 and terminating at an upper edge 5. A lid 6 attaches to the upper edge 5 of the perimeter side wall to seal the storage container 1 shut. As illustrated herein, the storage container 1 is constructed out of transparent material that allows a user to see the contents thereof. However, the storage container 1 may be constructed out of any material, such as plastic, cardboard, paper, metal, wood and so forth.

A spouts 7 is located on the perimeter side wall 4 of the storage container 1. The spout 7 preferably comprise a front panel 9, two side panels 10 and a rear panel 11. The spout 7 is sized to hold a predetermined measurement unit of volume of the contents of the container. The lid 6 comprises a hinged panel 27 that covers the spout 7 while the spout is being filled. The hinged panel 27 may then be opened to dispense the contents of the spout 7.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A storage container comprising:
   a bottom panel having a perimeter edge and a perimeter side wall extending upward a predetermined distance from the perimeter edge and terminating at an upper edge thereof;
   a lid attached to the upper edge of the perimeter side wall to seal the storage container shut;
   a substantially rectangular-shaped opening located in the perimeter side wall;
   a spout pivotally mounted within the substantially rectangular-shaped opening;
   said spout having a front panel, two side panels and a rear panel;
   said rear panel and side panels prevent contents of the container captured in the spout from falling out of the spout while the storage container is in an upright position;
   a plurality of partitions positioned within the spout between the front panel and the rear panel;
   each of said plurality of partitions being oriented in a perpendicular position in relation to each of the two side panels;
   a sliding tab located on said perimeter wall above said substantially rectangular-shaped opening;
   said sliding tab being capable of sliding upward toward the upper perimeter of the perimeter wall and downward toward perimeter edge of the bottom panel; and
   said sliding tab being capable of engaging at least one of said plurality of partitions when said sliding tab is placed in a downward position, thereby preventing the at least one of said plurality of partitions from extending out of the substantially rectangular-shaped opening.

2. The storage container of claim 1 wherein:
when the spout is in a closed position, the front panel of the spout is parallel with the perimeter side wall, thereby sealing the storage container.

3. The storage container of claim 1 wherein:
the spout is sized to hold a predetermined measurement unit of volume of the contents of the container.

4. The storage container of claim 1 wherein:
said side panels further comprise upper edges that are angled downward away from an upper edge of the front panel when the spout is in a closed position.

5. The storage container of claim 1 further comprising:
at least one stop located on the rear panel to prevent the spout from extending out of the perimeter side wall when the spout is placed into an open position.

6. A storage container comprising:
a bottom panel having a perimeter edge and a perimeter side wall extending upward a predetermined distance from the perimeter edge and terminating at an upper edge thereof;
a lid attached to the upper edge of the perimeter side wall to seal the storage container;
a substantially rectangular-shaped opening located in the perimeter side wall;
a spout pivotally mounted within the substantially rectangular-shaped opening;
said spout having a front panel, two side panels and a rear panel;
said rear panel and side panels prevent contents of the container captured in the spout from falling out of the spout while the storage container is in an upright position;
a partition positioned within the spout between the front panel and the rear panel;
said partition being oriented in a perpendicular position in relation to each of the two side panels;
a sliding tab located on said perimeter wall above said substantially rectangular-shaped opening;
said sliding tab being capable of sliding upward and downward in relation to the perimeter wait; and
said sliding tab being capable of engaging said partition when said sliding tab is placed in a downward position, thereby preventing the partition from extending out of the substantially rectangular-shaped opening.

7. The storage container of claim 6 wherein:
said side panels further comprise upper edges that are angled downward away from an upper edge of the front panel when the spout is in a closed position.

8. The storage container of claim 6 further comprising:
at least one stop located on the rear panel to prevent the spout from extending out of the perimeter side wall when the spout is placed into an open position.

9. A storage container comprising:
a bottom panel having a perimeter edge and a perimeter side wall extending upward a predetermined distance from the perimeter edge and terminating at an upper edge thereof;
a lid attached to the upper edge of the perimeter side wall to seal the storage container;
a substantially rectangular-shaped opening located in the perimeter side wall;
a spout pivotally mounted within the substantially rectangular-shaped opening;
said spout having a front panel, two side panels and a rear panel;
said rear panel and side panels prevent contents of the container captured in the spout from falling out of the spout while the storage container is in an upright position;
a plurality of partitions positioned within the spout between the front panel and the rear panel;
each of said plurality of partitions being oriented in a perpendicular position in relation to each of the two side panels;
said plurality of partitions having varying heights;
said plurality of partitions being positioned in a sequential order from a shortest height to a tallest height;
a sliding tab located on said perimeter wall above said substantially rectangular-shaped opening;
said sliding tab being capable of sliding upward and downward in relation to the perimeter wall; and
said sliding tab being capable of engaging at least one of said plurality of partitions when said sliding tab is placed in a downward position, thereby preventing the at least one of said plurality of partitions from extending out of the substantially rectangular-shaped opening.

10. The storage container of claim 9 wherein:
said side panels further comprise upper edges that are angled downward away from an upper edge of the front panel when the spout is in a closed position.

11. The storage container of claim 9 further comprising:
at least one stop located on the rear panel to prevent the spout from extending out of the perimeter side wall when the spout is placed into an open position.

* * * * *